US009086877B2

(12) United States Patent
Thomson et al.

(10) Patent No.: US 9,086,877 B2
(45) Date of Patent: Jul. 21, 2015

(54) SYSTEM AND METHOD OF MONITORING A CENTRAL PROCESSING UNIT IN REAL TIME

(71) Applicant: QUALCOMM Incorporated, San Diego, CA (US)

(72) Inventors: Steven S. Thomson, San Diego, CA (US); Ali Iranli, San Diego, CA (US); Michael J. Drop, San Diego, CA (US); Vinodh R. Cuppu, Oceanside, CA (US); Christopher Kong Yee Chun, Austin, TX (US); Tao Xue, San Diego, CA (US); Haw-Jing Lo, San Diego, CA (US); Moinul H. Khan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 13/668,764

(22) Filed: Nov. 5, 2012

(65) Prior Publication Data
US 2013/0061069 A1 Mar. 7, 2013

Related U.S. Application Data

(63) Continuation of application No. 12/859,424, filed on Aug. 19, 2010, now Pat. No. 8,352,759.

(60) Provisional application No. 61/294,006, filed on Jan. 11, 2010.

(51) Int. Cl.
*G06F 1/32* (2006.01)

(52) U.S. Cl.
CPC .............. *G06F 1/3203* (2013.01); *G06F 1/324* (2013.01); *G06F 1/3296* (2013.01); *Y02B 60/1217* (2013.01); *Y02B 60/1285* (2013.01)

(58) Field of Classification Search
CPC ............. G06F 1/26; G06F 1/32; G06F 1/324; G06F 1/3296
USPC .................................. 713/300, 320, 322, 323
See application file for complete search history.

(56) References Cited

U.S. PATENT DOCUMENTS 6,175,849 B1 * 1/2001 Smith ........................... 708/320
6,647,349 B1 11/2003 Hady et al.
(Continued)

FOREIGN PATENT DOCUMENTS

CN    1784646 A    6/2006
JP    2006524374 A    10/2006
(Continued)

OTHER PUBLICATIONS

Moriwake, S., et al., "Resource Management Mechanism for Mobile Code on Heterogenious Hosts", 16(2005-OS-98), IPSJ SIG Technical Reports, Information Processing Society of Japan, Feb. 22, 2005, pp. 97-104.
(Continued)

*Primary Examiner* — Chun Cao
(74) *Attorney, Agent, or Firm* — Shirin Tefagh

(57) ABSTRACT

Devices and methods for monitoring one or more central processing units in real time are disclosed. The method may include monitoring state data associated with the one or more CPUs in real-time, filtering the state data, and at least partially based on filtered state data, selectively altering one or more system settings. A device may include means for monitoring state data associated with the one or more CPUs in real-time, means for filtering the state data, and means for selectively altering one or more system settings at least partially based on filtered state data. A device may also include a sub-sampling circuit configured to receive a hardware core signal from the central processing unit and output a central processing unit state indication, and an infinite impulse response filter connected to the sub-sampling circuit and configured to receive the central processing unit state indication from the sub-sampling circuit.

22 Claims, 11 Drawing Sheets

(56) References Cited

U.S. PATENT DOCUMENTS

| | | | |
|---|---|---|---|
| 7,093,036 | B2 | 8/2006 | Raghunath et al. |
| 7,337,339 | B1 | 2/2008 | Choquette et al. |
| 7,484,111 | B2 | 1/2009 | Fung |
| 7,519,843 | B1* | 4/2009 | Buterbaugh et al. .......... 713/322 |
| 7,549,075 | B2 | 6/2009 | He et al. |
| 7,594,128 | B2* | 9/2009 | Bacchus et al. .............. 713/300 |
| 7,594,132 | B2* | 9/2009 | Kim .............................. 713/300 |
| 7,711,966 | B2 | 5/2010 | Prabhakaran et al. |
| 7,945,804 | B2* | 5/2011 | Jacobowitz et al. .......... 713/501 |
| 8,352,759 | B2 | 1/2013 | Thomson et al. |
| 8,433,543 | B2* | 4/2013 | LeBrun ......................... 702/189 |
| 8,869,152 | B1* | 10/2014 | Abrishami et al. ........... 718/102 |
| 2001/0003206 | A1 | 6/2001 | Pole, II et al. |
| 2003/0110012 | A1 | 6/2003 | Orenstien et al. |
| 2004/0163000 | A1 | 8/2004 | Kuhlmann et al. |
| 2004/0225902 | A1 | 11/2004 | Cesare et al. |
| 2005/0132238 | A1* | 6/2005 | Nanja ........................... 713/300 |
| 2007/0139014 | A1* | 6/2007 | Girson et al. ................. 320/132 |
| 2008/0085717 | A1* | 4/2008 | Chhabra et al. .............. 455/450 |

FOREIGN PATENT DOCUMENTS

| | | |
|---|---|---|
| WO | WO9531782 A1 | 11/1995 |
| WO | WO0229535 A2 | 4/2002 |
| WO | 2004102363 A2 | 11/2004 |
| WO | WO2007049100 A1 | 5/2007 |
| WO | 2009138953 A1 | 11/2009 |

OTHER PUBLICATIONS

International Preliminary Report on Patentability—PCT/US2011/020701, The International Bureau of WIPO—Geneva, Switzerland, Apr. 26, 2012.

International Search Report and Written Opinion—PCT/US2011/020701—ISA/EPO—Oct. 20, 2011.

Sinha et al., "Dynamic voltage scheduling using adaptive filtering of workload traces", Fourteenth International Conference on VLSI Design, Jan. 3, 2001, pp. 221-226, IEEE, XP010531459, ISBN: 978-0-7695-0831-3, DOI: 10.1109/ICVD.2001.902664.

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

* cited by examiner

SYSTEM AND METHOD OF MONITORING A CENTRAL PROCESSING UNIT IN REAL TIME

RELATED APPLICATIONS

This application is a continuation of U.S. patent application Ser. No. 12/859,424, filed Aug. 19, 2010, entitled SYSTEM AND METHOD OF MONITORING A CENTRAL PROCESSING UNIT IN REAL TIME, which is hereby incorporated by reference in its entirety. The present application claims priority to U.S. Provisional Patent Application Ser. No. 61/294,006, entitled SYSTEM AND METHOD OF MONITORING A CENTRAL PROCESSING UNIT IN REAL TIME, filed on Jan. 11, 2010, the contents of which are fully incorporated by reference.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of monitoring a CPU in real time.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
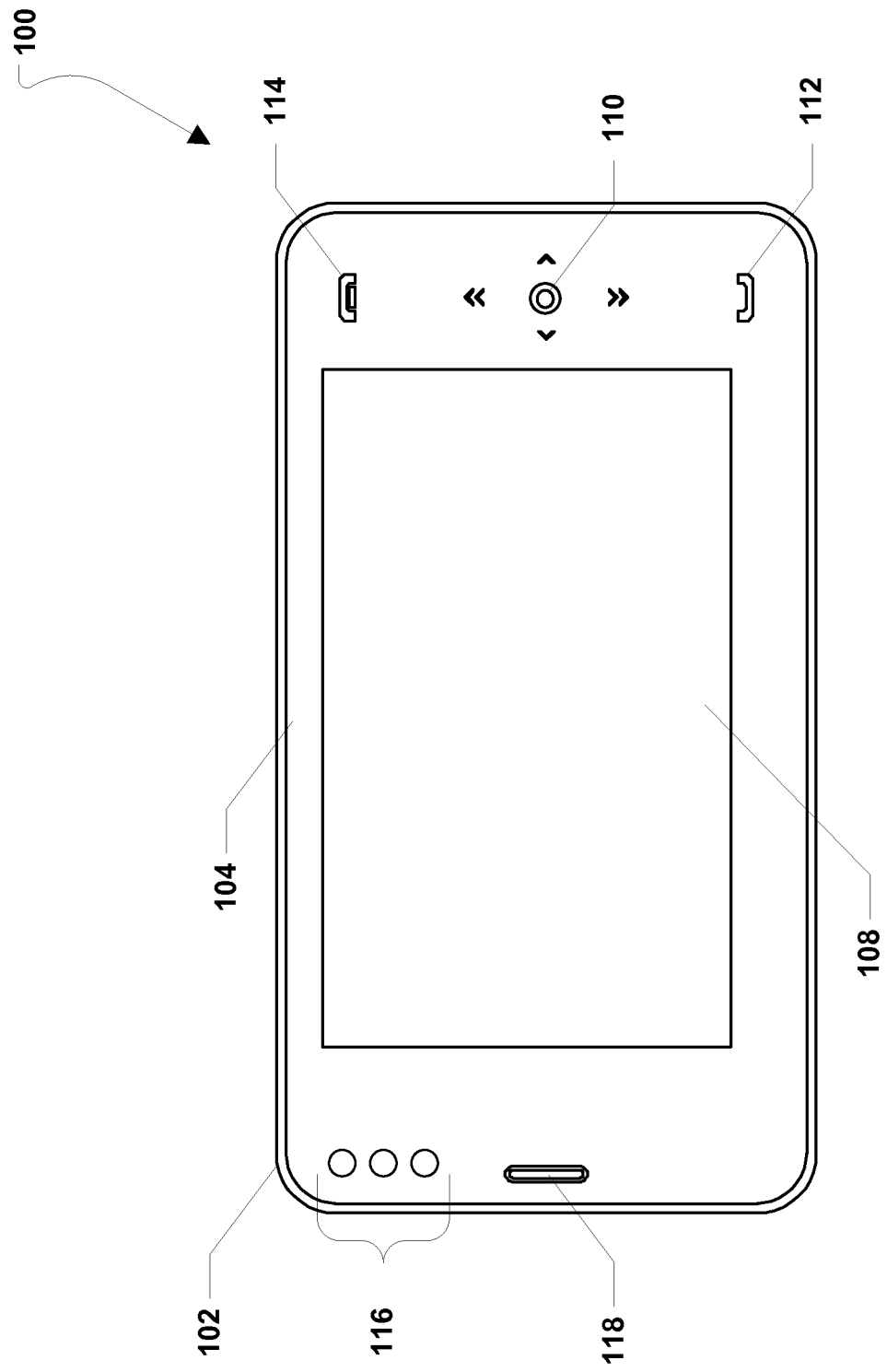
FIG. 1 is a front plan view of a first aspect of a portable computing device (PCD) in a closed position.
Figure 2:
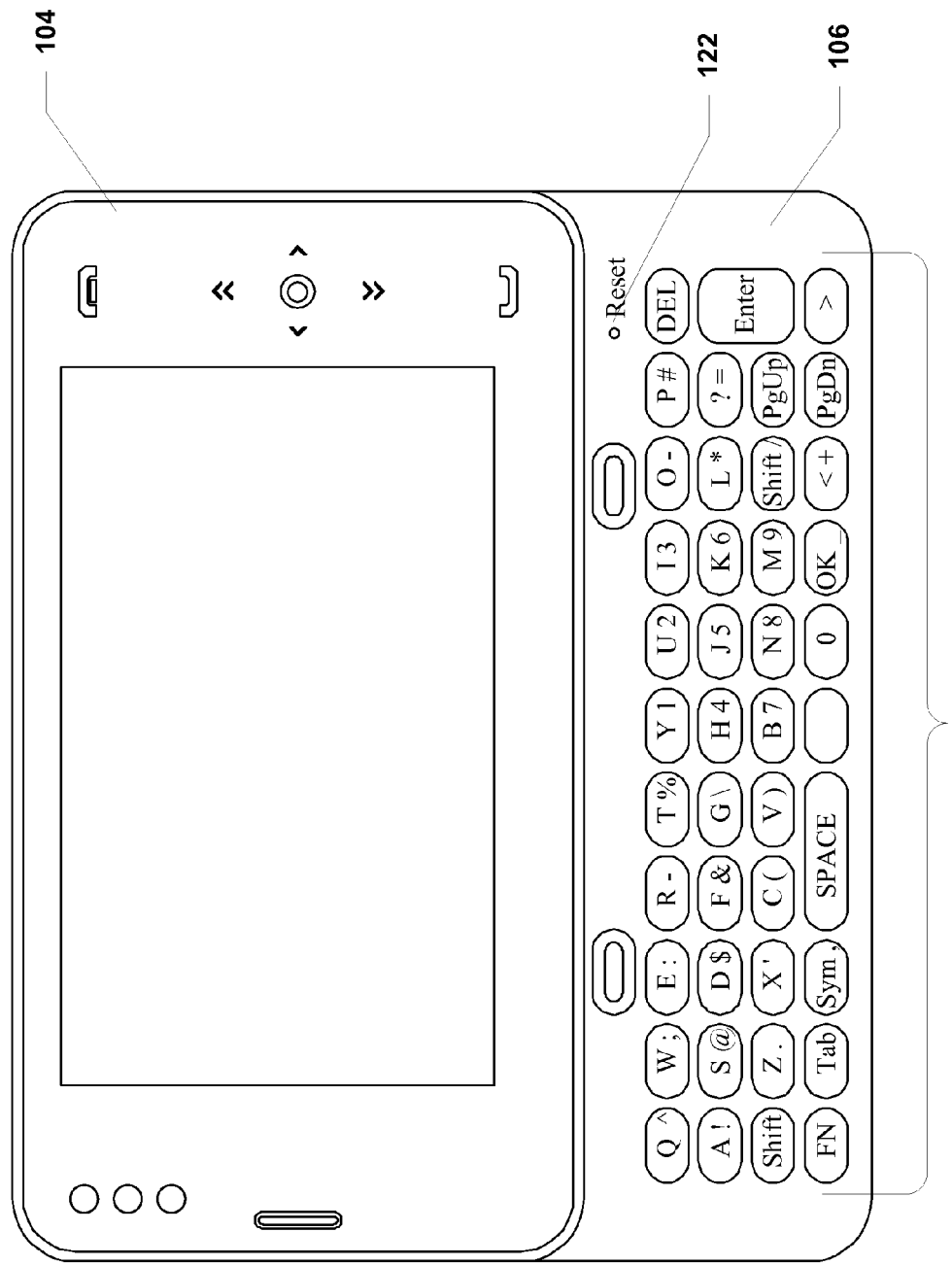
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
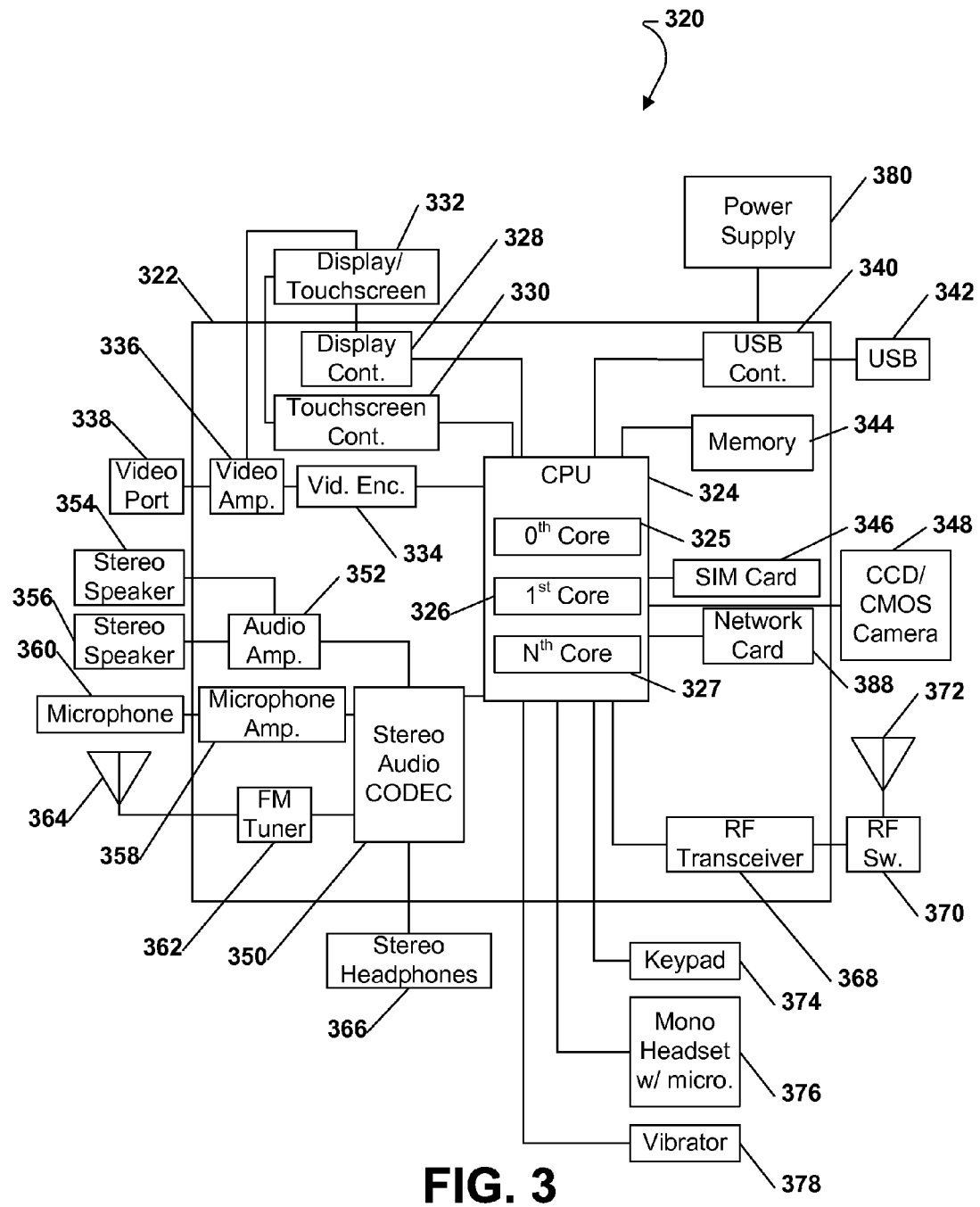
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344 or a combination thereof may serve as a means for executing one or more of the method steps described herein in order to monitor the multicore CPU 324 in real time and change any relevant system settings.

Figure 4:
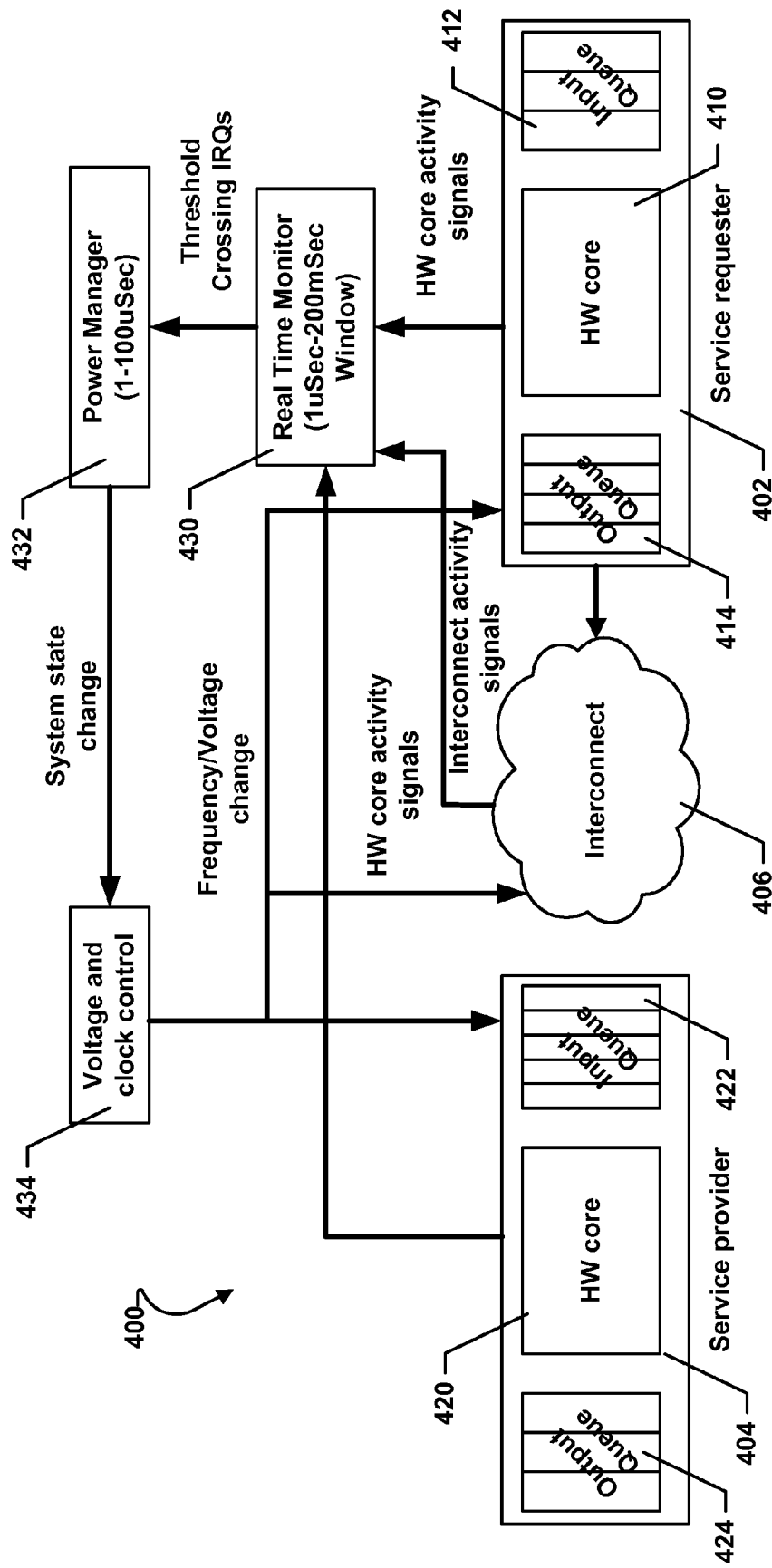
FIG. 4 is a block diagram of a second aspect of a processing system.

Referring to FIG. 4, a processing system is shown and is generally designated 400. As shown, the processing system 400 may include a service requester 402 connected to a service provider 404 via an interconnect device 406. FIG. 4 indicates that the service requestor 402 may include at least one hardware (HW) core 410, aka, a central processing unit. Further, the service requester 402 may include an input queue 412 connected to the HW core 410. An output queue 414 may also be connected to the HW core 410. The service provider 404 may include at least one hardware (HW) core 420, aka, a central processing unit. The service provider 404 may include an input queue 422 connected to the HW core 420. Further, an output queue 424 may also be connected to the HW core 420.

As illustrated in FIG. 4, a real time monitor 430 may be connected to the service requestor 402 and the service provider 404. Further, a power manager 432 may be connected to the real time monitor 430. The system 400 may also include a voltage and clock controller 434 connected to the power manager 432, the service provider 404, the interconnect device 406, and the service requestor 402. In a particular aspect, the real time monitor 430, the power manager 432, the voltage and clock controller 434, the cores 410, 420, or any combination thereof may serve as a means for executing the method steps described herein in order to monitor the cores 410, 420 in real time and change one or more system settings.

In a particular aspect, during operation, the real time monitor 430 may receive one or more HW core activity signals from the HW core 410 within the service requestor, one or more HW core activity signals from the HW core 420 within the service provider 404, one or more interconnect activity signals from the interconnect device 406, or a combination thereof. In one aspect, the real time monitor 430 may monitor the HW cores 410, 420 and the interconnect 406 periodically in a time window having a length between one microsecond and two hundred milliseconds (1 μs-200 ms).

Based on the activity of the HW core 410 within the service requestor 402, the activity of the HW core 420 within the service provider 404, the activity of the interconnect device 406, or a combination thereof, the real time monitor 430 may transmit an interrupt request to the power manager 432 when the activity is greater than a predetermined threshold or less than a predetermined threshold, as described in detail below. The power manager 432 may respond to the real time monitor 430 within a time period between one microsecond and one hundred microseconds (1-100 μSec). In response to the interrupt request from the real time monitor 430, the power manager 432 may issue a system state change to the voltage and clock controller 434. The voltage and clock controller 434 may then transmit a frequency change, a voltage change, or a combination thereof to the service provider 404, the interconnect device 406, the service requestor 402, or a combination thereof. Accordingly, based on the activity of the service requestor 402, the activity of the service provider 404, the activity of the interconnect device 406, or a combination thereof, the voltage, the frequency, or a combination thereof associated with the service provider 404, the interconnect device 406, the service requester 402 may be change in real-time as the activity changes.

In a particular aspect, the system 400 illustrated in FIG. 4 may be used for real time monitoring. Specifically, each HW core 410, 420 may signal associated active state data to the real time monitor 430 for each clock cycle. The real time monitor 430 may collect and integrate this data over a programmable period of time, i.e., within a one microsecond to two hundred millisecond (1 µs-200 ms) window. Further, the real time monitor 430 may interrupt the power manager 432 if a condition is met, e.g., a high threshold is crossed, a low threshold is crossed, etc. The power manager 432 may then respond by making any necessary system changes, e.g., changing a voltages, changing a frequency, or a combination thereof, in order to maintain a required quality of service (QoS).

Figure 5:
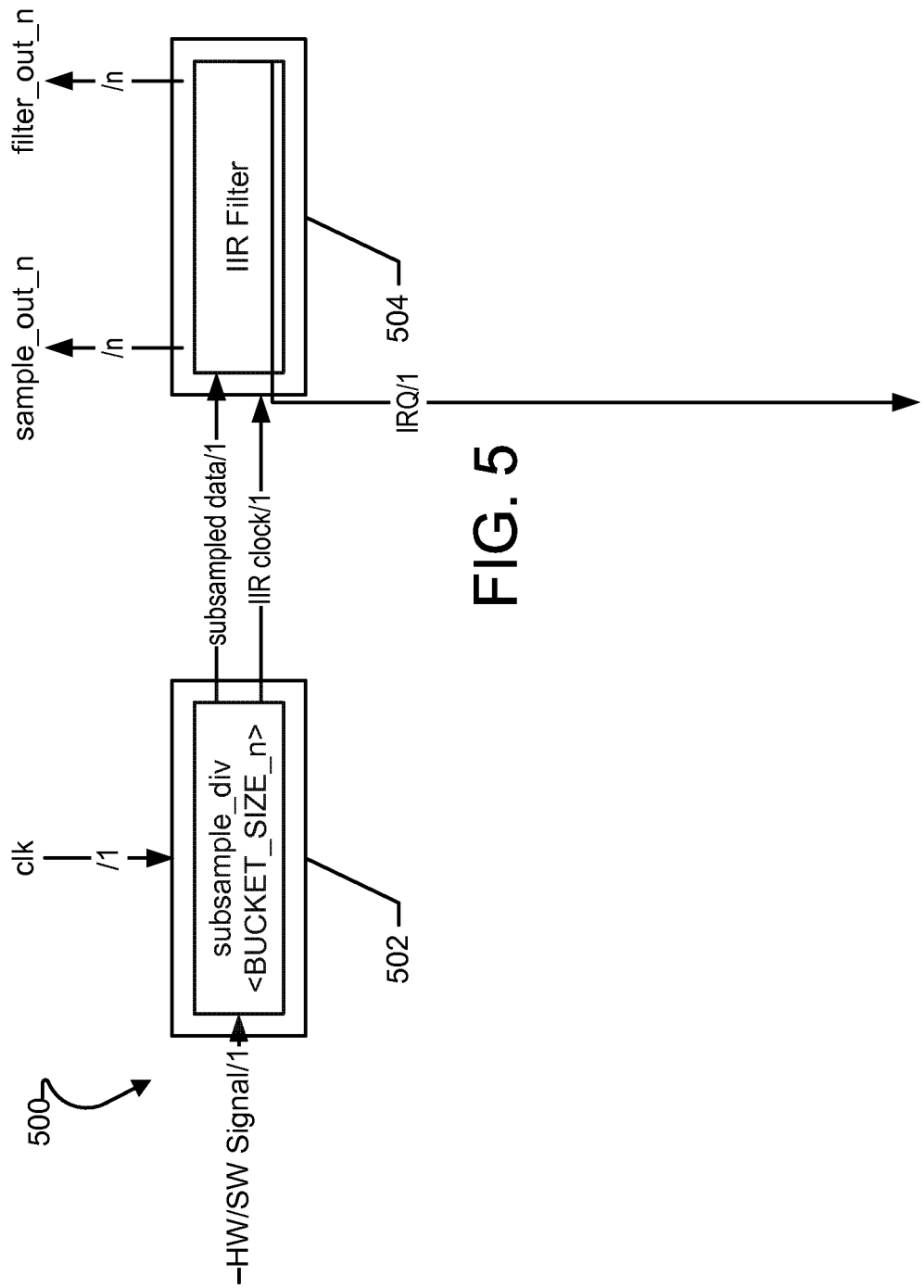
FIG. 5 is a block diagram of a first aspect of a monitoring system.

FIG. 5 illustrates a first aspect of a monitoring system, generally designated 500. The monitoring system 500 may include a sub-sampling system 502 and an infinite impulse response (IIR) filter 504. During operation, the sub-sampling system 502 may read a software (SW) or hardware (HW) controlled signal in order to determine state information associated with a core. The state information may include an active state, an idle state, some other state, or a combination thereof. Further, in a particular aspect, the SW/HW signal may be a single bit register. The sub-sampling system 502 may also read a clock signal. The clock signal may also be a single bit register. The sub-sampling system 502 may output sub-sampling data and IIR clock data to the IIR filter 504. In a particular aspect, the sub-sampling data may be single bit data and the IIR clock data may be single bit data.

In a particular aspect, as described below, the IIR filter 504 may take the state information, e.g., sub-sampled data, from the sub-sampling system and manipulate the data using a low pass filter, a high pass filter, or a combination thereof. Further, the IIR filter 504 may compare the filtered data to one or more thresholds and if a condition is met, e.g., an upper threshold is crossed, a lower threshold is crossed, or a combination thereof, the IIR filter 504 may generate an interrupt request. The interrupt request may be transmitted to a power manager and the power manager may issue a system state change in order to change a frequency, a voltage, or a combination thereof.

In a particular aspect, the system 500 shown in FIG. 5, may utilize software to generate a desired signal by setting a register bit. A hardware filter 504 may asynchronously sample the register bit and use the register bit as an input to a low pass filter, a high pass filter, or a combination thereof. Thereafter, the hardware filter 504 may process the filtered data using one or more comparators and if the filtered data is greater than an upper threshold or less than a lower threshold, the hardware filter 504 may generate an interrupt. The system 500 may allow an arbitrary signal to be generated by software, or some logical entity acting on behalf of the software. The signal may be filtered in hardware. The system 500 provides substantially low power overhead and a very wide filter response range of less than one microsecond (1 µs) to greater than two hundred milliseconds (200 ms). In a particular aspect, the IIR filter 504 may be a hardware filter or a software filter.

Figure 6:
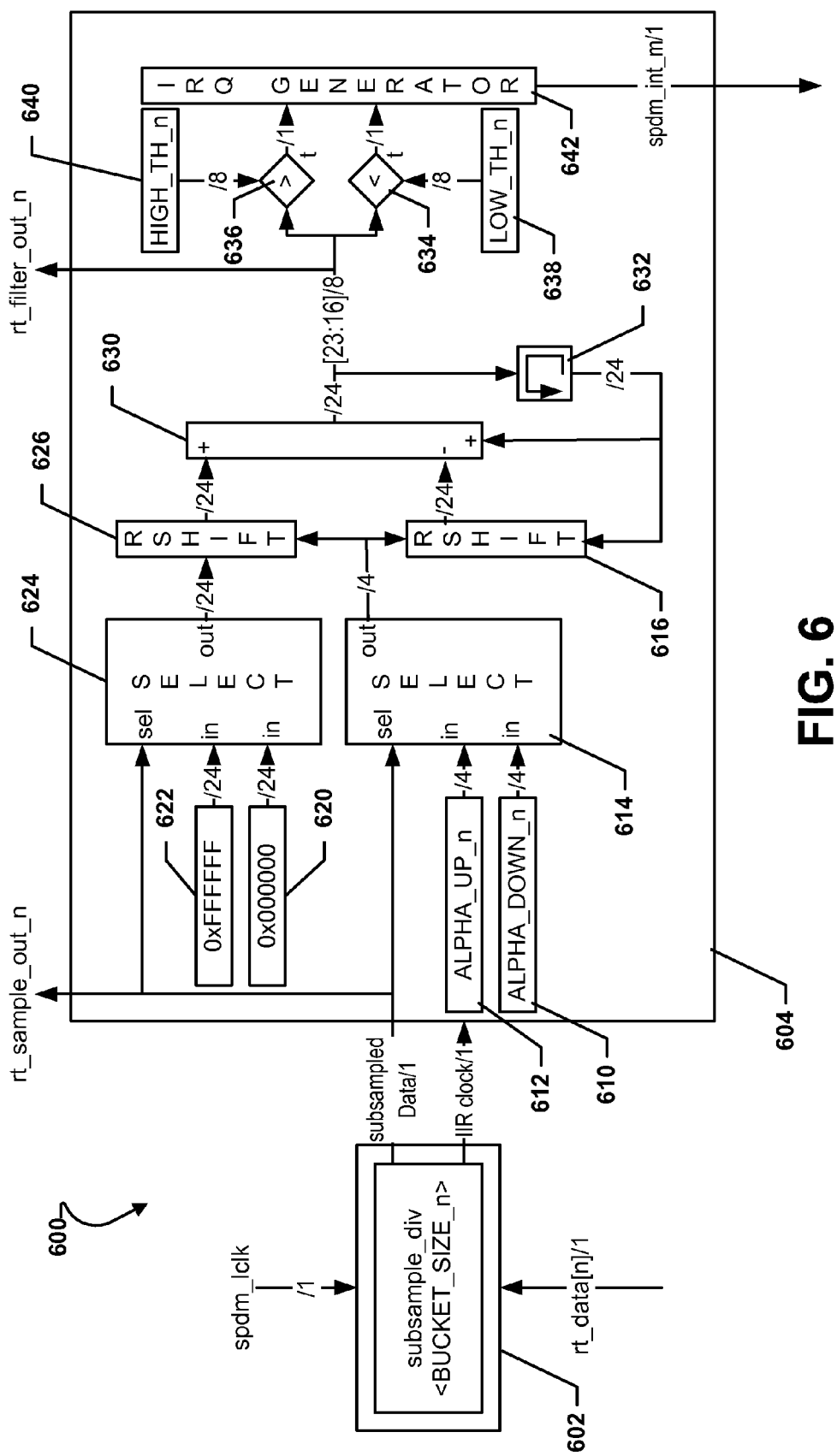
FIG. 6 is a block diagram of a second aspect of a monitoring system.

Referring now to FIG. 6, a second aspect of a monitoring system is illustrated and is generally designated 600. As shown, the monitoring system 600 may include a sub-sampling system 602 connected to a filter 604. In a particular aspect, the filter 604 may be an infinite impulse response (IIR) filter. As shown, the filter 604 may include a down alpha coefficient register 610 and an up alpha coefficient register 612 connected to a first selector 614. In a particular aspect, the down alpha coefficient register 610 and the up alpha coefficient register 612 may be four bits long and each may store a respective a down alpha coefficient and an up alpha coefficient. The alpha coefficients may be configurable by a user. Depending on the sub-sampled data received from the sub-sampling system 602, the first selector 614 may select the down alpha coefficient from the down alpha coefficient register 610 or the up alpha coefficient from the up alpha coefficient register 612. For example, if the sub-sampled data bit is equal to one (1), the up alpha coefficient may be selected. If the sub-sampled data bit is equal to zero (0), the down alpha coefficient may be selected. As shown in FIG. 6, the first selector 614 may be connected to the two right bit shifters 616 and 626 respectively, and used to shift their respective inputs by the selected alpha coefficient bits to the right. In particular, the first right shifter 616 may be used to shift the previous contents of the IIR memory register 632 by the selected alpha coefficient bits to the right.

FIG. 6 further illustrates that the filter 604 may include a "000000" value register 620 and an "FFFFFF" value register 622 connected to a second selector 624. The "000000" value register 620 may be twenty-four bits long and may include a "000000" value. Further, the "FFFFFF" value register 622 may be twenty-four bits long and may include a "FFFFFF" value. In a particular aspect, the "000000" value and the "FFFFFF" value are not user configurable. Depending on the sub-sampled data received from the sub-sampling system 602, the second selector 624 may select the "000000" value from the "000000" value register 620 or the "FFFFFF" value from the "FFFFFF" value register 622. For example, if the sub-sampled data bit is equal to one (1), the "FFFFFF" value may be selected. If the sub-sampled data bit is equal to zero (0), the "000000" value may be selected. As shown in FIG. 6, the second selector 624 may be connected as the input to a second right bit shifter 626 that may be used to shift the selected value the selected alpha coefficient bits to the right.

As depicted in FIG. 6, the filter 604 may include a summation unit 630 coupled to the first right bit shifter 616 and the second right bit shifter 626. Further, a memory register 632 may also be connected to the summation unit 630. Also, a first comparator 634 and a second comparator 636 may be connected to the summation unit 630. A low threshold register 638 may be connected to the first comparator 634 and a high threshold register 640 may be connected to the second comparator 636. In a particular aspect, each threshold register 638, 640 may be eight bits long and may include a threshold value to which the current filter value may be compared. Each threshold value may be user configurable. As shown, an interrupt request (IRQ) generator 642 may be connected to the comparators 634, 636.

In a particular aspect, the summation unit 630 may receive a previous filter value from the memory register 632 and the summation unit 630 may subtract the value from the first right bit shifter 616 from the previous filter value stored in the memory register 632 and add the value from the second right bit shifter 626 to that result. Then, the summation unit 630 may output a new filter value to the memory register 632 in order to replace the previous filter value. This value may be twenty four (24) bits. The summation unit 630 may also output the top eight bits of the current filter value to the first comparator 634 and the second comparator 636.

The first comparator 634 may compare the current filter value, i.e., the top eight bits of the current filter value, to the low threshold value stored in the low threshold register 638. The second comparator 636 may compare the current filter value, i.e., the top eight bits of the current filter value, to the high threshold value stored in the high threshold register 640. If the current value is less than the low threshold value or greater than the high threshold value, either comparator may output a single bit indicator to the IRQ generator 642. Then, the IRQ generator 642 may generate an interrupt request and transmit that interrupt request to a power manager.

The system 600 shown in FIG. 6 may be used for the real time monitoring of one or more hardware cores. In particular, a single bit input signal may be sampled at a fixed frequency and then, down sampled to a programmable IIR clock frequency. The IIR may include a simple single register IIR with independent programmable up and down coefficients, i.e., the alphas coefficients. The output of the IIR may then be compared against high and low thresholds and a signal generated if either threshold is exceeded.

In a particular aspect, the system 600 may use the lower and upper thresholds to trigger an adjustment of the system state. Software may be invoked to handle situations when the monitored systems, e.g., cores, are out of their desired operational limits. The system 600 uses direct inputs and direct outputs and there may be no observational impact to the monitored systems, e.g., cores. Further, increasing the sampling rate may not impact performance of the monitored system. Additionally, the system 600 may allow for substantially faster monitoring than monitoring that may be available using software solutions.

In another particular aspect, the input signal characteristic to the filter may be a single bit without a clock bit and, therefore not require balancing of input signals which may simplify signal routing. The input signal may be multi-bit if a clock bit is utilized and the inputs are balanced. Moreover, the input signal may allow for multi bit signals to be provided without the need to convert to a single bit input.

In a particular aspect, the filter 604 may use an independent rise and fall rate in a single IIR filter. As such, hardware costs may be reduced and the possibility of a simultaneous low and high threshold crossing when the rise and fall rates differ may be eliminated. The filter 604 may also provide a single unified output value that can be used for comparing to a low and high threshold. Further, the filter 604 may provide a variable down sample to the input signal. The filter 604 may retain a long term average value and a variable bucket size. Also, the filter 604 may allow for a wide dynamic range and a wide range in the granularity of the filter 604, e.g., by determining the duration that each input sample to the filter 604 represents. The filter 604 may also provide a variable IIR window size and the filter 604 may allow for a wide range in tuning by setting the rate at which the filter output can change.

As described in conjunction with FIG. 6, the filter 604 may include two or more independently programmable coefficients, i.e., the alpha coefficients 610, 612. The coefficients may be selected based on an input, e.g., the input signal being high (1) or low (0). The selected coefficient 610, 612 may then be used to scale both the mapped input value (e.g., mapped to 0xFFFFFF in the case of the input being high and 0x000000 in the case of the input being low) and the previous output value, i.e., the previous filter value, and the scaled values may be added back into the previous output value to form a new output value, i.e., the current filter value. The output of the filter, i.e., the current filter value, may then be compared against one or more threshold values.

The filter 604 has the ability to implement multiple independent coefficients using a single IIR filter with a single seamless output value that can be compared to a high/low threshold. Further, the filter 604 has the ability to apply two or more independent coefficients to a single IIR filter and the ability to implement two independent thresholds using a single IIR filter. The filter 604 further includes a variable down sample to input signal with no loss in long term average value. Also, the filter 604 provides a single seamless output signal that is not reset at transition points between increasing and decreasing input duty cycle. The filter 604 allows for a lower cost implementation in lieu of using two independent IIR filters and the filter 604 may mimic a standard IIR filter by setting both coefficients to the same value.

Figure 7:
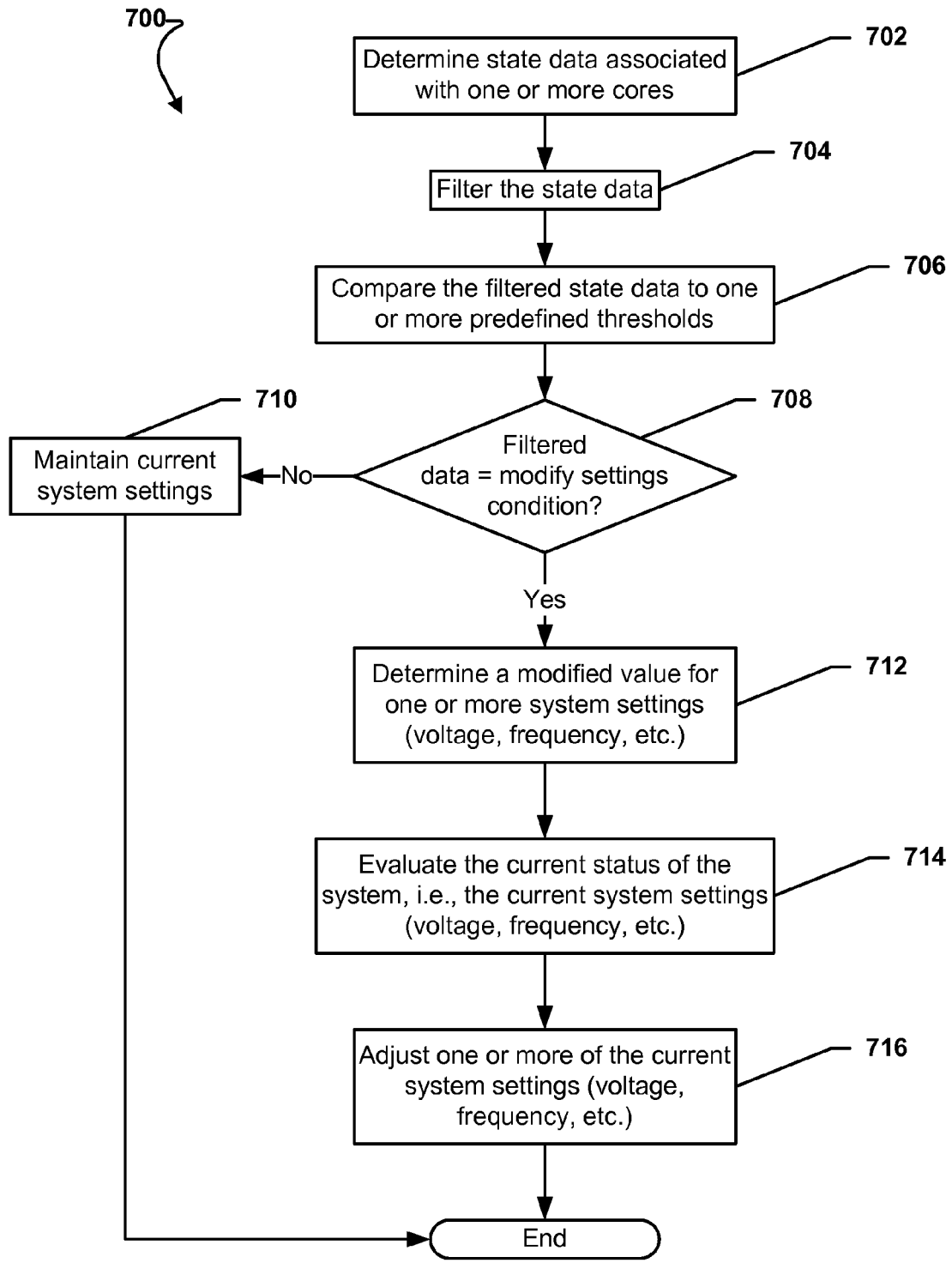
FIG. 7 is a flowchart illustrating a first aspect of a method of monitoring a central processing unit in real time.

Referring now to FIG. 7, a first aspect of monitoring a central processing unit in real time is shown and commences at block 702. At block 702, a controller may determine state data associated with one or more hardware cores. The state data may include busy (i.e., active), idle, etc. In one aspect, the controller may receive the state data substantially in real time. Further, in one aspect, the controller may receive the state data directly from the hardware cores. Alternatively, the controller may receive the state data from a memory register. In another aspect, the state data may be generated by software that monitors the hardware cores.

Moving to block 704, the controller may filter, or otherwise manipulate, the state data. For example, the controller may process the data using one or more low pass filters, one or more high pass filters, one or more bit shifters, one or more summation units, one or more integrators, one or more other arithmetic logic units, or a combination thereof. At block 706, the controller may compare the filtered state data to one or more predefined thresholds, e.g., using one or more comparators.

Moving to decision 708, the controller may determine whether the filtered data satisfies a modify settings condition. In a particular aspect, in order to satisfy the modify settings condition, the filtered data may be greater than a predetermined upper threshold. In another aspect, in order to satisfy the modify settings condition, the filtered data may be less than a predetermined lower threshold. In either case, if the modify settings condition is not satisfied at decision 708, the method 700 may proceed to block 710. At block 710, the controller may maintain the current system settings, e.g., the current CPU frequency, the current CPU voltage, etc. Then, the method 700 may end.

Returning to decision 708, if the filtered data satisfies the modify settings condition, the method 700 may proceed to block 712. At block 712, the controller may determine a modified value for one or more system settings, e.g., voltage, frequency, etc. Next, at block 714, the controller may evaluate the current status of the system, i.e., the current system settings. At block 716, the controller may adjust one or more of the current system settings as needed according to the modified values for the system settings determined above. The method 700 may then end.

Figure 8:
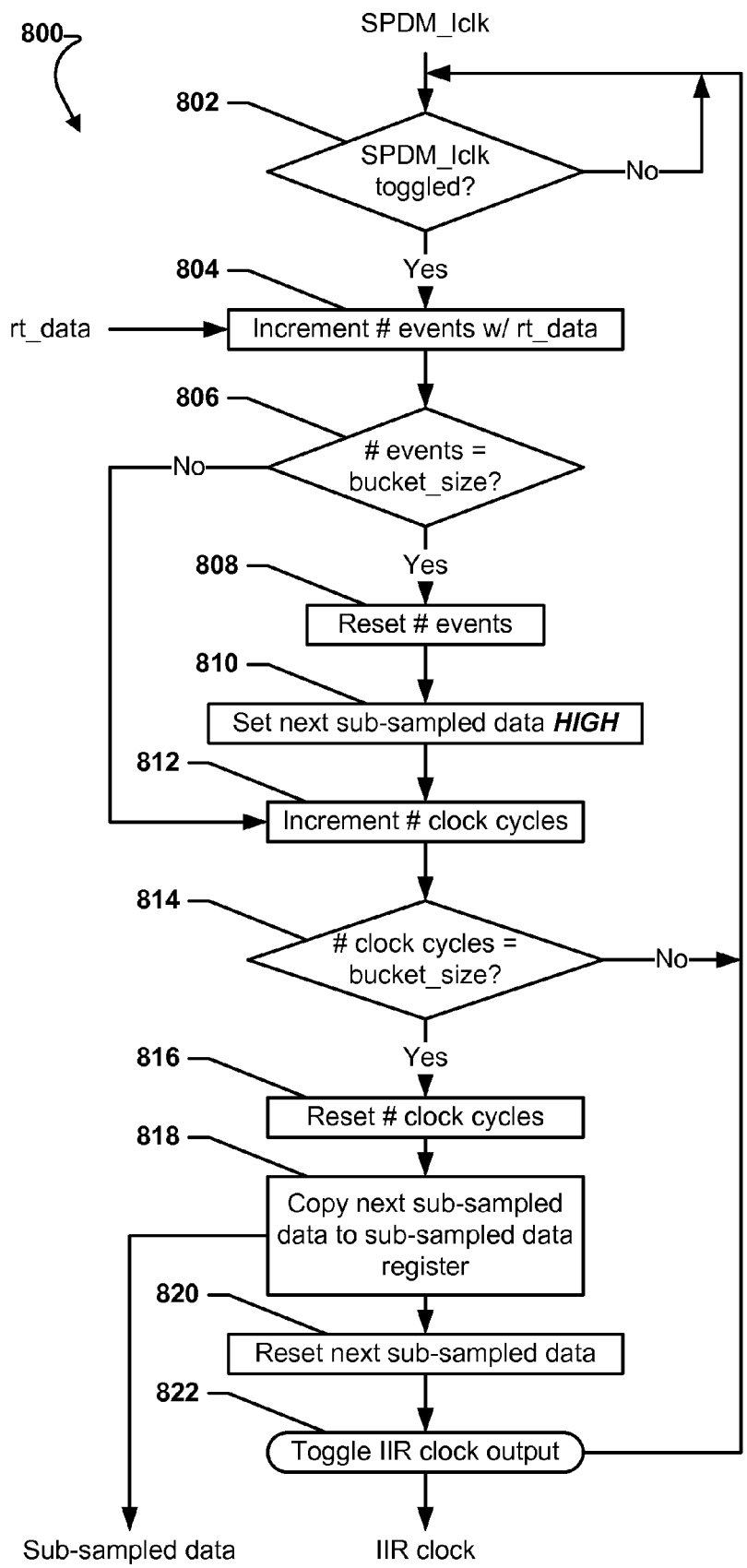
FIG. 8 is a flowchart illustrating a method of sub-sampling data.

FIG. 8 illustrates a method of sub-sampling data, designated 800. As shown, the method 800 may begin at decision 802 when a system profiling and diagnostic monitoring (SPDM) clock signal is received. At decision 802, a sub-sampling unit may determine whether the SPDM clock signal is toggled. If not, the method 800 returns to the beginning and the sub-sampling unit may wait for the next SPDM clock signal to be received.

IF the SPDM clock signal is toggled, the method 800 may proceed to block 804. At block 804, real-time data may be received and the sub-sampling unit may increment a number of events with the real time data. Thereafter, at decision 806, the sub-sampling unit may determine whether the number of events is equal to a bucket size. If so, the method 800 may move to block 808 and the sub-sampling unit may reset the number of events. At block 810, the sub-sampling unit may set the next sub-sampled data to a HIGH value. Further, at block 812, the sub-sampling unit may increment a number of clock cycles. From block 812, the method 800 may proceed to decision 814.

Returning to decision 806, if the number of events does not equal the bucket size, the method 800 may move directly to block 812 and the sub-sampling unit may increment the number of clock cycles. Then, the method 800 may proceed to decision 814. At decision 814, the sub-sampling unit may determine whether the number of clock cycles is equal to the bucket size. If not, the method 800 may return to beginning and the sub-sampling unit may wait for the next SPDM clock signal to be received.

Otherwise, if the number of clock cycles equals the bucket size, the method 800 may proceed to block 816 and the sub-sampling unit may reset the number of clock cycles. Next, at block 818, the sub-sampling unit may copy the next sub-sampled data to a sub-sampled data register. Also, the sub-sampling unit may output the sub-sampled data to a filter, e.g., a hardware filter, a software filter, or a combination thereof.

Moving to block 820, the sub-sampling unit may reset the next sub-sampled data. Moreover, at block 822, the sub-sampling unit may toggle an IIR clock output and output an IIR clock signal. Thereafter, the method 800 may return to the beginning and the sub-sampling unit may wait for the next SPDM clock signal to be received.

Figure 9:
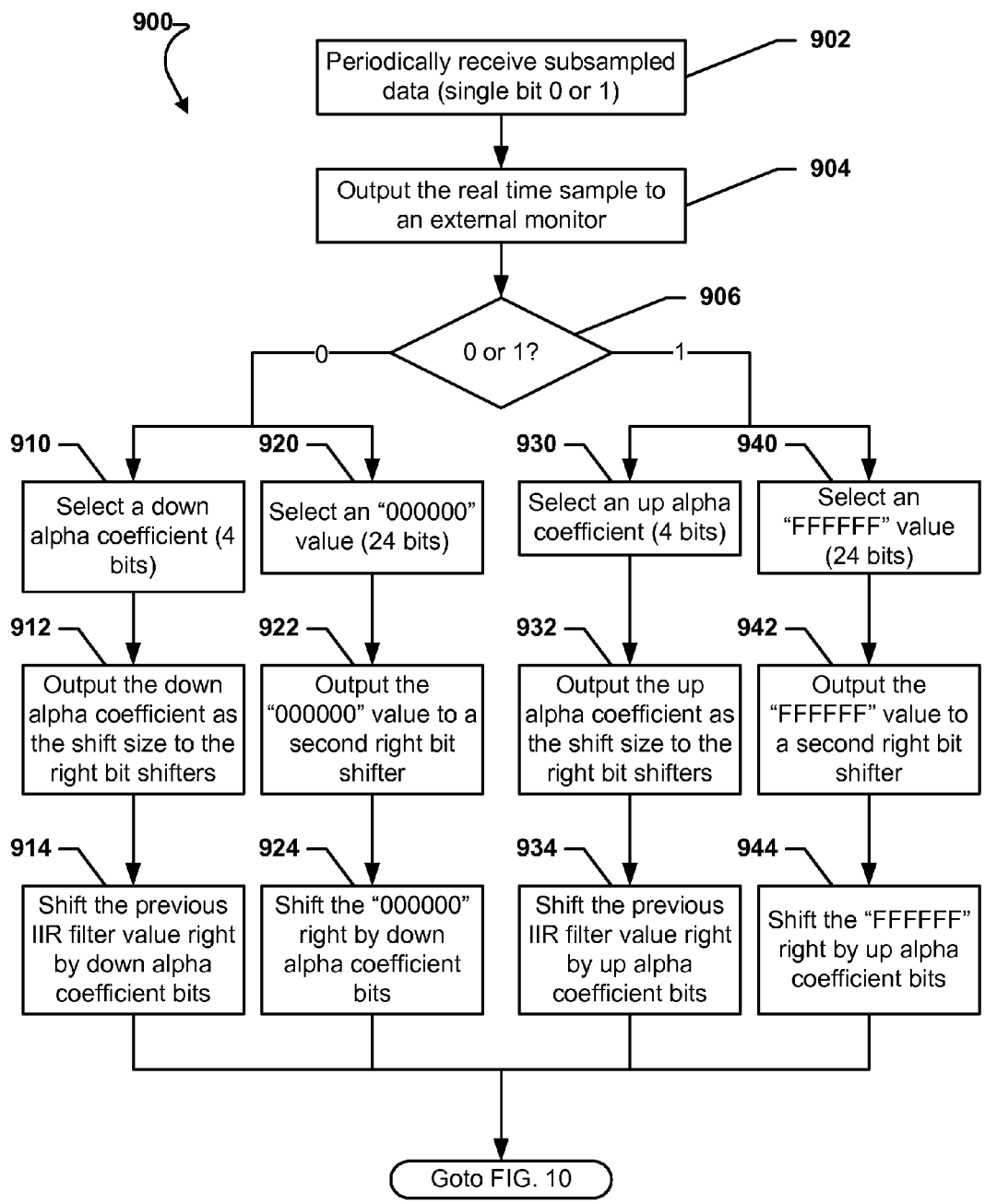
FIG. 9 is a flowchart illustrating a first portion of a second aspect of a method of monitoring a central processing unit in real time.

Referring now to FIG. 9, a second aspect of a method of monitoring a central processing unit in real time is shown and is generally designated 900. The method 900 begins at block 902. At block 902, a filter may periodically receive sub-sampled data. In a particular aspect, the sub-sampled data is down sampled and may include a single bit having a value of zero (0) or one (1). At block 904, the filter may output a real time sample to an external monitor. The real time sample is the same as the sub-sampled data received at block 902.

Moving to decision 906, the filter may determine a value of the sub-sampled data, i.e., zero (0) or one (1). If the value of the sub-sampled data is zero, the filter may perform steps 910 through 914 and steps 920 through 924. Specifically, at block 910, the filter may select a down alpha coefficient at a bit selector. In a particular aspect, the down alpha coefficient is a four (4) bit value that is programmable or otherwise configurable. At block 912, the filter may output the down alpha coefficient from the bit selector as the shift size to the right bit shifters. Next, at block 914, the first right bit shifter may shift the previous IIR filter value right by the down alpha coefficient bits. From block 914, the method 900 may proceed to block 1006 of FIG. 10, described below.

At block 920, the filter may select an "000000" value that is twenty-four (24) bits long at a bit selector. Then, at block 922, the filter may output the "000000" value to a second right bit shifter. At block 924, the second right bit shifter may shift the "000000" value right by the down alpha coefficient bits. From block 924, the method 900 may proceed to block 1006 of FIG. 10, described below.

Returning to decision 906, if the value of the sub-sampled data is one, the filter may perform steps 930 through 934 and steps 940 through 944. In particular, at block 930, the filter may select an up alpha coefficient at a bit selector. In a particular aspect, the up alpha coefficient is a four (4) bit value that is programmable or otherwise configurable. At block 932, the filter may output the up alpha coefficient from the bit selector as the shift size to the right bit shifters. Next, at block 934, the first right bit shifter may shift the previous IIR filter value right by the up alpha coefficient bits. From block 934, the method 900 may proceed to block 1006 of FIG. 10, described below.

At block 940, the filter may select an "FFFFFF" value that is twenty-four (24) bits long at a bit selector. Then, at block 942, the filter may output the "FFFFFF" value to a second right bit shifter. At block 944, the second right bit shifter may shift the "FFFFFF" value right by up alpha coefficient bits. From block 944, the method 900 may proceed to block 1006 of FIG. 10, described below.

Figure 10:
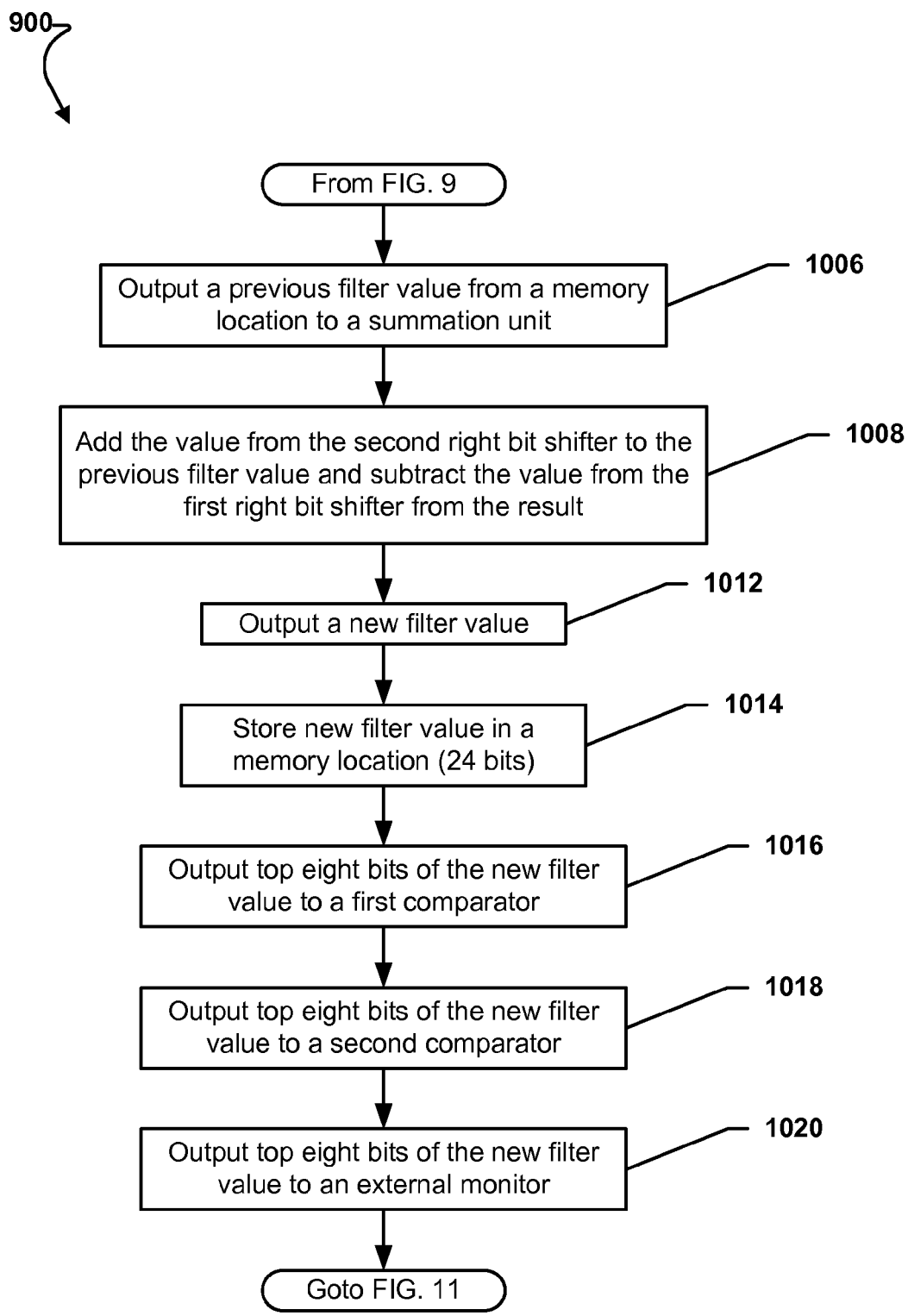
FIG. 10 is a flowchart illustrating a second portion of a second aspect of a method of monitoring a central processing unit in real time.

At block 1006 of FIG. 10, the filter may output a previous filter value from a memory location to a summation unit. At block 1008, the summation unit may add the value from the second right bit shifter to the previous filter value and subtract the value from the first right bit shifter from the result.

At block 1012, the summation unit may output a new filter value. Moving to block 1014, the filter may store the new filter value in a memory location. The memory location may be a memory register having twenty-four (24) bits. Next, at 1016, the filter may output the top eight bits of the new filter value to a first comparator. At block 1018, the filter may output the top eight bits of the new filter value to a second comparator. Also, at block 1020, the filter may output the top eight bits of the new filter value to an external monitor. Thereafter, the method 900 may proceed to block 1102 of FIG. 11.

Figure 11:
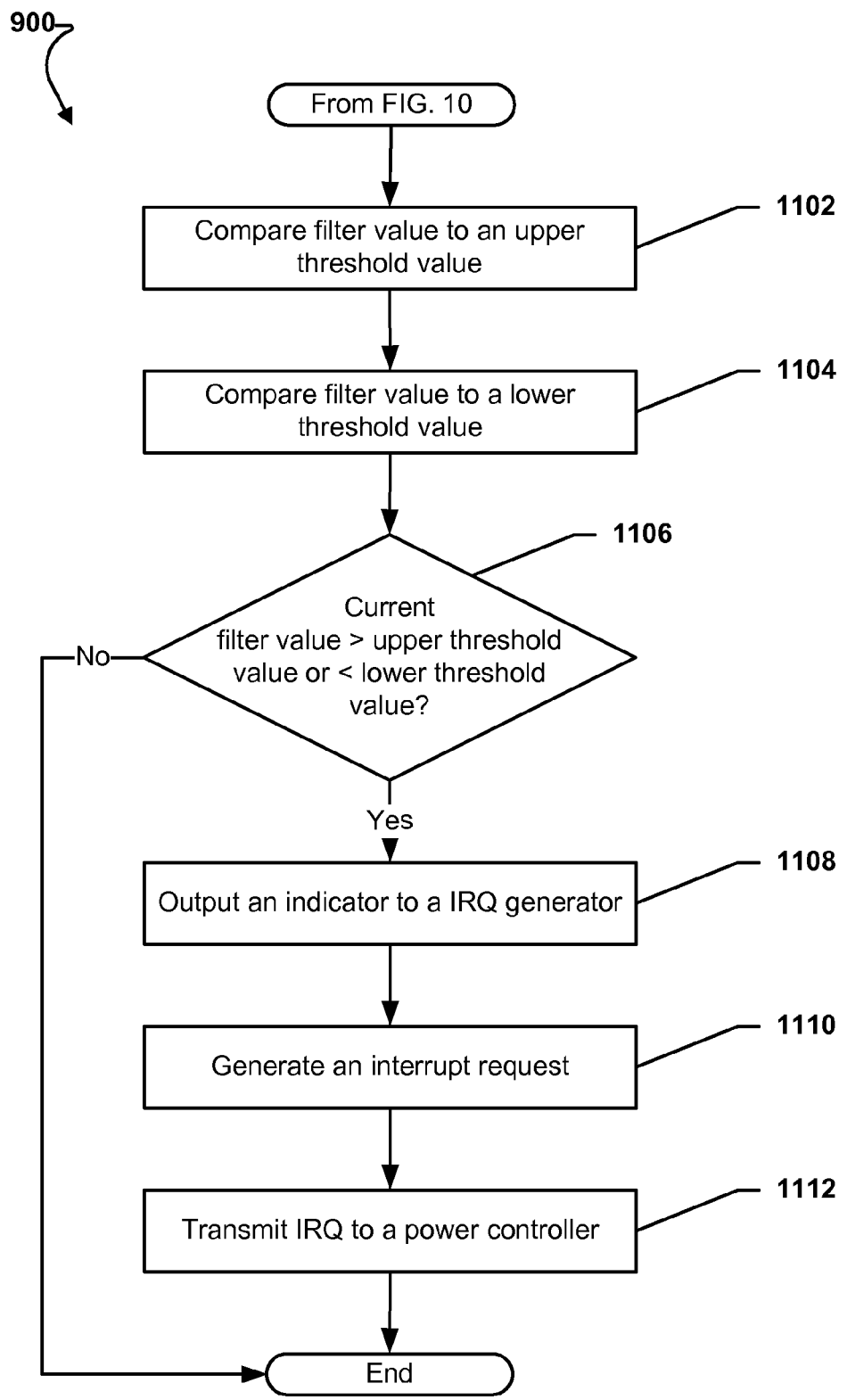
FIG. 11 is a flowchart illustrating a third portion of a second aspect of a method of monitoring a central processing unit in real time.

At block 1102 of FIG. 11, a first comparator within the filter may compare the current filter value to an upper threshold value. At block 1104, a second comparator within the filter may compare filter value to a lower threshold value.

Proceeding to decision 1106, the filter may determine whether the current filter value is greater than an upper threshold value or less than a lower threshold value. The upper threshold value, the lower threshold value, or a combination thereof may be programmable or otherwise configurable. If the current filter value is not greater than the upper threshold value or is not less than the lower threshold value, the method 900 may end.

On the other hand, at decision 1106, if the current filter value is greater than the upper threshold value or is less than the lower threshold value, the method 900 may proceed to block 1108 and the filter may output an indicator to an interrupt request (IRQ) generator. At block 1110, the IRQ generator may generate an interrupt request. Then, at block 1112, the IRQ generator may transmit the IRQ to a power controller. Then, the method 900 may end.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof. Further, the method steps described herein may be executed on a single core processor, a multicore processor, multiple single core processors, multiple multicore processors, or any combination thereof.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the spirit and scope of the present invention, as defined by the following claims.

What is claimed is:

1. A method of monitoring a central processing unit in real time, the method comprising:
   receiving a hardware core signal from the central processing unit at a sub-sampling system;
   determining a state of the central processing unit based at least in part on the received hardware core signal;
   generating sub-sampling data based at least in part on the determined state of the central processing unit;
   sending the sub-sampling data to an infinite impulse response filter;
   selecting an alpha coefficient based on a value of the sub-sampling data;
   filtering the sub-sampling data in the infinite impulse response filter using the selected alpha coefficient to generate filtered data;
   comparing the filtered data to a threshold value in the infinite impulse response filter; and
   adjusting a voltage or frequency of the central processing unit based on the comparison.

2. The method of claim 1, wherein:
   comparing the filtered data to a threshold value in the infinite impulse response filter comprises:
      determining whether the filtered data is above a high threshold value in the infinite impulse response filter; and
      determining whether the filtered data is below a low threshold value in the infinite impulse response filter; and
   adjusting a voltage or frequency of the central processing unit based on the comparison comprises adjusting the voltage or frequency of the central processing unit upon the filtered data being above the high threshold value or below the low threshold value.

3. The method of claim 1, wherein adjusting a voltage or frequency of the central processing unit based on the comparison comprises:
   determining whether the comparison satisfies a modify settings condition;
   determining a modified value for a voltage or frequency of the central processing unit upon the comparison satisfying the modify settings condition; and
   adjusting the voltage or frequency of the central processing unit to the determined modified value.

4. The method of claim 1, wherein a state of the central processing unit is an active state or an idle state.

5. The method of claim 1, wherein receiving a hardware core signal from the central processing unit at a sub-sampling system comprises receiving a hardware core signal from the central processing unit at a sub-sampling system during every clock cycle of the central processing unit.

6. The method of claim 1, wherein selecting an alpha coefficient based on a value of the sub-sampling data comprises:
   determining a state of the sub-sampling data as high or low;
   selecting an up alpha coefficient when the state of the sub-sampling data is high; and
   selecting a down alpha coefficient when the state of the sub-sampling data is low.

7. The method of claim 1, wherein sending the sub-sampling data to an infinite impulse response filter comprises:
   determining, at the sub-sampling system, whether a number of clock cycles is equal to a bucket size; and
   sending the sub-sampling data to the infinite impulse response filter when the number of clock cycles is equal to the bucket size.

8. The method of claim 7, wherein the bucket size, the alpha coefficient, and the threshold value are configurable by a user.

9. A wireless device, comprising:
   means for receiving a hardware core signal from the central processing unit at a sub-sampling system;
   means for determining a state of the central processing unit based at least in part on the received hardware core signal;
   means for generating sub-sampling data based at least in part on the determined state of the central processing unit;
   means for sending the sub-sampling data to an infinite impulse response filter;
   means for selecting an alpha coefficient based on a value of the sub-sampling data;
   means for filtering the sub-sampling data in the infinite impulse response filter using the selected alpha coefficient to generate filtered data;
   means for comparing the filtered data to a threshold value in the infinite impulse response filter; and
   means for adjusting a voltage or frequency of the central processing unit based on the comparison.

10. The wireless device of claim 9, wherein:
   means for comparing the filtered data to a threshold value in the infinite impulse response filter comprises:
      means for determining whether the filtered data is above a high threshold value in the infinite impulse response filter; and
      means for determining whether the filtered data is below a low threshold value in the infinite impulse response filter; and
   means for adjusting a voltage or frequency of the central processing unit based on the comparison comprises means for adjusting the voltage or frequency of the central processing unit upon the filtered data being above the high threshold value or below the low threshold value.

11. The wireless device of claim 9, wherein means for adjusting a voltage or frequency of the central processing unit based on the comparison comprises:
   means for determining whether the comparison satisfies a modify settings condition;
   means for determining a modified value for a voltage or frequency of the central processing unit upon the comparison satisfying the modify settings condition; and means for adjusting the voltage or frequency of the central processing unit to the determined modified value.

12. The wireless device of claim 9, wherein a state of the central processing unit is an active state or an idle state.

13. The wireless device of claim 9, wherein means for receiving a hardware core signal from the central processing unit at a sub-sampling system comprises means for receiving a hardware core signal from the central processing unit at a sub-sampling system during every clock cycle of the central processing unit.

14. The wireless device of claim 9, wherein means for selecting an alpha coefficient based on a value of the sub-sampling data comprises:
   means for determining a state of the sub-sampling data as high or low;
   means for selecting an up alpha coefficient when the state of the sub-sampling data is high; and
   means for selecting a down alpha coefficient when the state of the sub-sampling data is low.

15. The wireless device of claim 9, wherein means for sending the sub-sampling data to an infinite impulse response filter comprises:
   means for determining, at the sub-sampling system, whether a number of clock cycles is equal to a bucket size; and
   means for sending the sub-sampling data to the infinite impulse response filter when the number of clock cycles is equal to the bucket size.

16. The wireless device of claim 15, wherein the bucket size, the alpha coefficient, and the threshold value are configurable by a user.

17. A device for monitoring a central processing unit, comprising:
   a sub-sampling circuit configured to receive a hardware core signal from the central processing unit and output a central processing unit state indication; and
   an infinite impulse response filter connected to the sub-sampling circuit and configured to receive the central processing unit state indication from the sub-sampling circuit, wherein the infinite impulse response filter comprises:
      a first selector connected to an first alpha register and a second alpha register, the first selector configured to select an alpha coefficient from the first alpha register or the second alpha register based on the central processing unit state indication and output a selected alpha coefficient;
      a second selector connected to first value register and a second value register, the second selector configured to select a value from the first value register or the second value register based on the central processing unit state indication and output a selected value;
      a first shifter connected to the first selector and a memory register, the first shifter configured to receive a previous filter value from the memory register and the selected alpha coefficient from the first selector and shift the previous filter value by the selected alpha coefficient to output a shifted previous filter value;
      a second shifter connected to the first selector and the second selector, the second shifter configured to receive the selected value from the second selector and the selected alpha coefficient from the first selector and shift the selected value by the selected alpha coefficient to output a shifted selected value;
      a summation unit connected to the first shifter, the second shifter, and the memory register, the summation unit configured to receive the previous filter value from the memory register, the shifted selected value, and the shifted previous filter value and add the shifted selected value to a result of subtracting the shifted previous filter value from the previous filter value to output a current filter value;
      a first comparator connected to the summation unit and a first threshold register, the first comparator configured to receive at least a portion of the current filter value from the summation unit and a first threshold value from the first threshold register and output a first comparison indication; and
      an interrupt generator connected to the first comparator and configured to receive the first comparison indication from the first comparator and output an interrupt request to adjust a voltage or frequency of the central processing unit in response to receiving the first comparison indication.

18. The device of claim 17, wherein:
   the first alpha register is an up alpha register storing an up alpha coefficient; and
   the second alpha register is a down alpha register storing a down alpha coefficient.

19. The device of claim 17, wherein:
   the infinite impulse response filter further comprises a second comparator connected to the summation unit and a second threshold register, the second comparator configured to receive the at least a portion of the current filter value from the summation unit and a second threshold value from the second threshold register and output a second comparison indication, and
   the interrupt generator is further connected to the second comparator and configured to receive the second comparison indication from the second comparator and output the interrupt request to adjust the voltage or frequency of the central processing unit in response to receiving the first comparison indication or second comparison indication.

20. The device of claim 19, wherein:
   the first threshold value is a high threshold value;
   the second threshold value is a low threshold value;
   the first comparator is configured to output the first comparison indication when the current filter value is greater than the high threshold value; and
   the second comparator is configured to output the second comparison indication when the current filter value is less than the low threshold value.

21. The device of claim 19, wherein the sub-sampling circuit is further configured to receive a clock cycle indication and output the central processing unit state indication upon a number of clock cycles exceeding a bucket size.

22. The device of claim 21, wherein the first alpha register, the second alpha register, the first threshold value, the second threshold value, and the bucket size are configurable by a user during operation of the device.

* * * * *